Patented Jan. 12, 1926.

1,569,040

UNITED STATES PATENT OFFICE.

CHESTER A. SEASE, OF HARRISBURG, PENNSYLVANIA, ASSIGNOR OF ONE-FIFTH TO JOHN G. HOPWOOD, ONE-FIFTH TO JOHN M. FLETCHER, ONE-FIFTH TO JAMES S. CAREY, ALL OF HARRISBURG, PENNSYLVANIA, AND ONE-FIFTH TO FRANK M. HUNTER, OF LOWER PAXTON TOWNSHIP, DAUPHIN COUNTY, PENNSYLVANIA.

CORROSIVE-PREVENTING LIQUID COMPOSITION.

No Drawing. Application filed October 31, 1924. Serial No. 747,136.

*To all whom it may concern:*

Be it known that I, CHESTER A. SEASE, a citizen of the United States, residing in the city of Harrisburg, county of Dauphin, and State of Pennsylvania, have invented a new and useful Corrosive-Preventing Liquid Composition, of which the following is a specification.

The object of my invention is the production of an adhesive liquid composition to be applied to the surface of battery terminals and wires, and other corrodible battery parts, as a coating for the prevention of corrosion.

My composition consists of a mixture of ammonium stearate, otherwise known as ammonia powder, naphthalene powder, naphthalene balls, ammonia and water.

In preparing the composition I prefer to use the ingredients in about the following proportions, viz: ammonium stearate, two pounds; naphthalene powder, one and one-half pounds; naphthalene balls, one-half pound; ammonia, two quarts; water, about nine gallons. In mixing the ingredients I first put the ammonium stearate in a receptacle or vessel and dissolve it in two quarts of water. After the ammonium stearate has been dissolved, I boil it for twenty minutes. Immediately at the end of the twenty-minute boiling period I add the other ingredients in the following order: first, the ammonia, then the naphthalene balls, then the naphthalene powder and last the water; the water being poured in in sufficient quantity to make ten gallons of the composition.

My composition is non-poisonous, is non-explosive, is non-inflammable, is non-freezing, adheres to the surface to which it is applied, and as a whole possesses in a high degree all the desired properties for preventing the corrosion of battery terminals and wires and all other corrodible battery parts, it being necessary to make about sixty-day periodic applications of my composition to continuously insure against corrosion.

I claim:

1. An adhesive liquid composition adapted to form a coating for battery terminals, wires and all corrodible battery parts comprising one to three pounds of ammonium stearate, three pounds of naphthalene powder, one to three quarts of ammonium hydroxide, and eight to ten gallons of water.

2. An adhesive liquid composition consisting of two pounds of ammonium stearate, three pounds of naphthalene powder, two quarts of ammonium hydroxide and nine gallons of water.

CHESTER A. SEASE.